United States Patent [19]
Kim

[11] Patent Number: 6,016,559
[45] Date of Patent: Jan. 18, 2000

[54] MULTIFUNCTIONAL INTERGRATED ELECTRONIC PRODUCT AND METHOD FOR PREVENTING OPERATION FAILURE OF THE SAME

[75] Inventor: Yang Sung Kim, Suwon, Rep. of Korea

[73] Assignee: Samsung Electronics Co., Ltd., Suwon, Rep. of Korea

[21] Appl. No.: 08/960,245

[22] Filed: Oct. 29, 1997

[30] Foreign Application Priority Data

Oct. 30, 1996 [KR] Rep. of Korea ................. 96-50294

[51] Int. Cl.[7] .................................................. G06F 9/00
[52] U.S. Cl. ........................................... 714/48; 370/241
[58] Field of Search .................................. 714/48, 18, 21, 714/30, 39, 43, 52, 57, 704, 712, 748, 749, 751, 758, 798, 800–804, 4, 10, 47; 370/241, 242, 243, 252; 364/240.8, 240.9; 340/825.06, 825.07; 375/224, 220

[56] References Cited

U.S. PATENT DOCUMENTS

| | | | |
|---|---|---|---|
| 4,523,299 | 6/1985 | Donohue et al. ................... 364/900 |
| 4,587,652 | 5/1986 | Goldman ......................... 370/110.1 |
| 4,710,871 | 12/1987 | Belknap et al. ................... 364/200 |
| 4,805,194 | 2/1989 | Wesolowski ........................ 375/75 |
| 4,947,317 | 8/1990 | DiGiulio et al. .................. 364/200 |
| 4,970,714 | 11/1990 | Chen et al. ........................ 370/17 |
| 5,010,553 | 4/1991 | Scheller et al. .................... 371/35 |
| 5,414,717 | 5/1995 | Matsumoto et al. ................. 371/32 |
| 5,432,805 | 7/1995 | Kikuchi et al. .................... 371/53 |
| 5,584,033 | 12/1996 | Barrett et al. .................... 395/800 |
| 5,600,663 | 2/1997 | Ayanoglu et al. .................. 371/41 |
| 5,696,777 | 12/1997 | Hofsaess ......................... 371/68.1 |
| 5,740,185 | 4/1998 | Bosse ............................. 371/37.1 |
| 5,793,803 | 8/1998 | Barnes ............................ 375/222 |

OTHER PUBLICATIONS

Peter Kartaschoff, Synchronization in digital communication networks, Proceed. of the IEEE, pp. 1019–1028, Jul. 1991.

*Primary Examiner*—Robert W. Beausoliel, Jr.
*Assistant Examiner*—Nadeem Iqbal
*Attorney, Agent, or Firm*—Dilworth & Barrese

[57] ABSTRACT

A multifunctional integrated electronic product including a main microcomputer and a sub microcomputer configured as master and slave, respectively, is capable of preventing a malfunction caused by an error of data transmission between the microcomputers, and a method for the same. A main microcomputer generates control data for controlling the sub microcomputer function and generates following data when no errors are detected in the control data. The main microcomputer checks for a data receipt confirmation signal fed back from the sub microcomputer when there are no errors in the control signal. The absence of the data receipt confirmation signal causes the main microcomputer to repeatedly generate the same control data. When an error in the control data is detected by the sub microcomputer, the data receipt confirmation signal is not sent and an error generating signal is sent to the main microcomputer which causes the same to repeatedly generate the control data.

7 Claims, 4 Drawing Sheets

MULTIFUNCTIONAL INTERGRATED ELECTRONIC PRODUCT AND METHOD FOR PREVENTING OPERATION FAILURE OF THE SAME

BACKGROUND OF THE INVENTION

1. Field of the Invention

The present invention relates to a combined electronic product which integrates two or more electronic devices each having distinct functions. More particularly, it relates to a multifunctional integrated electronic product and method for preventing a malfunction of the same caused by an error generated when transmitting data between the microcomputers of the respective integrated devices.

2. Description of the Related Art

Generally, a combined electronic product or multifunctional integrated electronic product integrates two electronic devices each having different functions, and each with a microcomputer for performing their respective function. For example, a combined television and video cassette recorder. The two microcomputers of the two devices are configured in a master/slave arrangement. In the case of operating one function, a main microcomputer (master) unilaterally generates data for controlling the other microcomputer (slave) and performs the one function smoothly.

However, when transmitting data between the microcomputers of the two products having two distinct functions within the multifunctional integrated electronic product, the data is not transmitted smoothly. When integrating the devices having different functions, errors can be generated in transmitting data, thereby causing a malfunction of the products. For example, in the product which integrates a television and a video-CD player, a microcomputer controlling the video-CD player transmits data to the microcomputer controlling the television signal. As the transmission line of data between the two microcomputers is exposed to high frequencies generated by the television CRT, noise is generated. As a result of this noise, malfunctions occur as the microcomputer on the receiving end receives the error data unilaterally.

SUMMARY OF THE INVENTION

Therefore, it is an object of the present invention to provide a multifunctional integrated electronic product and a method for preventing an operation failure caused by a data transmission error between the integrated devices by checking the error of the transmitted data, and transmitting the checked information to a microcomputer which generates data.

To achieve the above-mentioned object, a multifunctional integrated electronic product for preventing an operation failure includes a main microcomputer which generates control data for controlling another function, generates following data when receiving a data receipt confirmation signal which is fed back from a sub microcomputer, and repeatedly generates the same control data when the data receipt confirmation signal is not received. A sub microcomputer receives the control data from the main microcomputer, outputs the data receipt confirmation signal to the main microcomputer when no error is detected as a result of the test for errors of the inputted data, and does not output the data receipt confirmation signal to the main microcomputer when an error is detected.

The method for preventing a malfunction caused by the error of data transmission between the master and slave microcomputers according to the invention includes the steps of: generating control data from the main microcomputer to the sub microcomputer to control another function; checking whether an error is present in the control data received by the sub microcomputer; outputting a data receipt confirmation signal from the sub microcomputer to the main microcomputer when no error is found in the control data (as a result of the error-checking); not outputting the data receipt confirmation signal from the sub microcomputer to the main microcomputer when an error is found in the checked control data; generating following data from the main microcomputer to the sub microcomputer when the data receipt confirmation signal has been received and checked by the main microcomputer; and, repeatedly generating the same control data when the data receipt confirmation signal is not received from the sub microcomputer.

Moreover, to achieve the above-mentioned object, the multifunctional integrated electronic product, includes: a main microcomputer which generates control data for controlling another function; repeatedly generates the same control data when a data error generating signal is received from the sub microcomputer and generates following data when the data error generating signal is not received. A sub microcomputer receives the control data from the main microcomputer, outputs the data error generating signal to the main microcomputer when an error has been detected as a result of the error-checking, and does not output the data error generating signal to the main microcomputer when no errors are present.

The method of the invention for preventing malfunction caused by errors in data transmission between the microcomputers includes the steps of: generating control data from the main microcomputer to the sub microcomputer to control another function of the sub microcomputer; checking whether an error is present in the control data received by the sub microcomputer; outputting a data error generating signal from the sub microcomputer to the main microcomputer when an error is present in the checked control data as a result of the error-checking; not outputting the data error generating signal from the sub microcomputer to the main microcomputer when an error is not present in the control data; generating following data from the main microcomputer to the sub microcomputer when the data error generating signal is not detected by the main microcomputer; and, repeatedly generating the same control data when the data error generating signal is generated.

BRIEF DESCRIPTION OF THE DRAWINGS

The above object and advantages of the present invention will be more clearly understood from the following detailed description taken in conjunction with the accompanying drawings, in which.

DETAILED DESCRIPTION OF THE PREFERRED EMBODIMENTS

Figure 1:
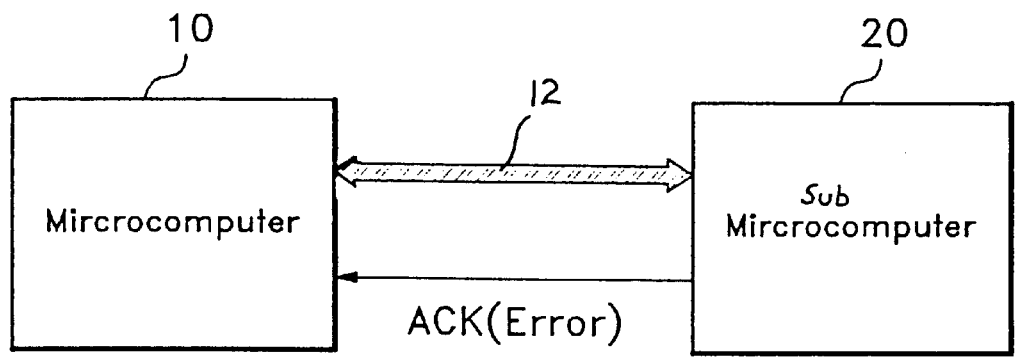
FIG. 1 is a block diagram representation of the multifunctional integrated electronic product for preventing a malfunction according to the present invention.
Figure 2:
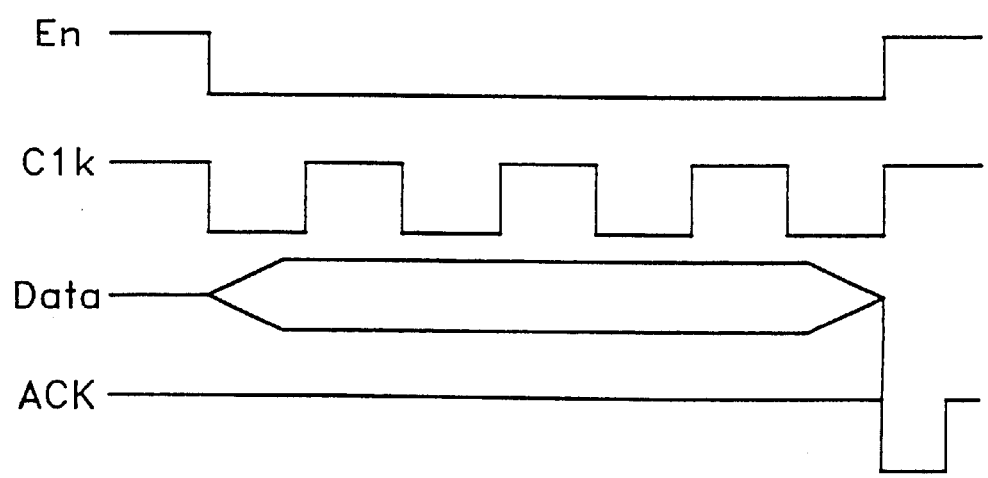
FIG. 2 is a graphical representation of timing waveforms illustrating the operation of the multifunctional integrated electronic product for preventing a malfunction according to the present invention.

Referring to FIGS. 1 and 2, there is master/slave relationship between a main microcomputer 10 and a sub microcomputer 20. Main microcomputer 10 and sub microcomputer 20 each have at least one input/output port that is connected to a data bus 12. In order to control the sub microcomputer 20, main microcomputer 10 outputs an enable signal "En", via data bus 12, to the sub microcomputer 20 having another function, and transmits control data signal "Data" via data bus 12 by synchronizing a clock signal "Clk". After receiving the control data signal "Data" transmitted from the main microcomputer 10, the sub microcomputer 20 checks the error of the received data signal "Data" using a parity bit. When no errors are present, the data receipt confirmation signal "ACK" is output to the main microcomputer 10. Data receipt confirmation signal "ACK" is transmitted on data bus 12, but is depicted separately for clarity. When an error is detected, sub microcomputer 20 does not output the data receipt confirmation signal "ACK". The main microcomputer 10 checks for the data receipt confirmation signal "ACK" output from sub microcomputer 20, and when it is present, generates following data. If the data receipt confirmation signal "ACK" is not received, the main microcomputer 10 generates the same control data.

When an error is present in the data and is detected by sub microcomputer 20 using the parity bit, a data error generating signal "Error" is output to main microcomputer 10 and the same data is repeatedly generated for re-transmission to sub microcomputer 20. When an error is not present, the data error generating signal "Error" is not transmitted and the following data can be generated. Data error generating signal "Error" is also transmitted via data bus 12, and is depicted separately for purposes of clarity.

Figure 3:
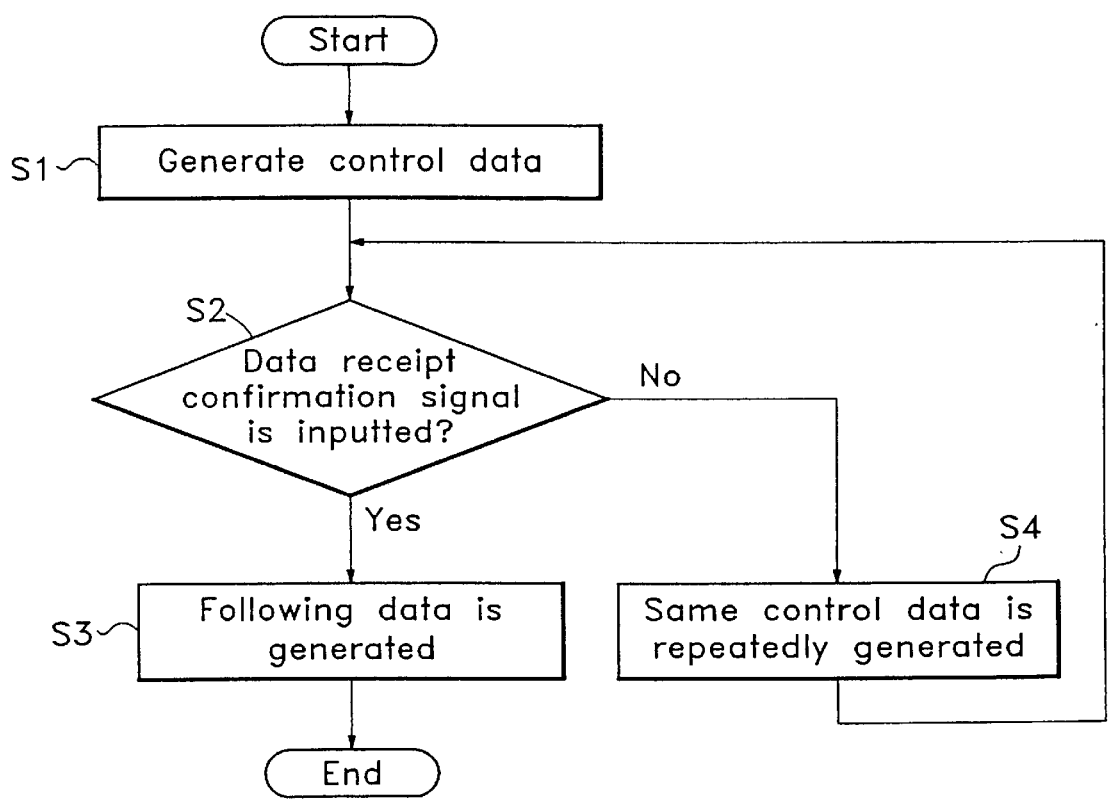
FIGS. 3 to 6 are flow charts illustrating the method for preventing a malfunction of the multifunctional integrated electronic product according to the present invention.

FIG. 3 is a flow chart illustrating the operation of main microcomputer 10 which receives the data receipt confirmation signal ACK. First, the main microcomputer 10 generates control data (S1) to control a sub microcomputer having another function. Main microcomputer 10 then checks whether the data receipt confirmation signal "ACK" is inputted or present (S2). When the data receipt confirmation signal "ACK" has been received or inputted, main microcomputer 10 generates following data (S3). When the data receipt confirmation signal "ACK" is not received or inputted, the same control data which was previously generated is repeatedly generated (S4). Upon each repeated generation of control data, main microcomputer 10 checks for the presence of data receipt confirmation signal "ACK" (S2).

Figure 4:
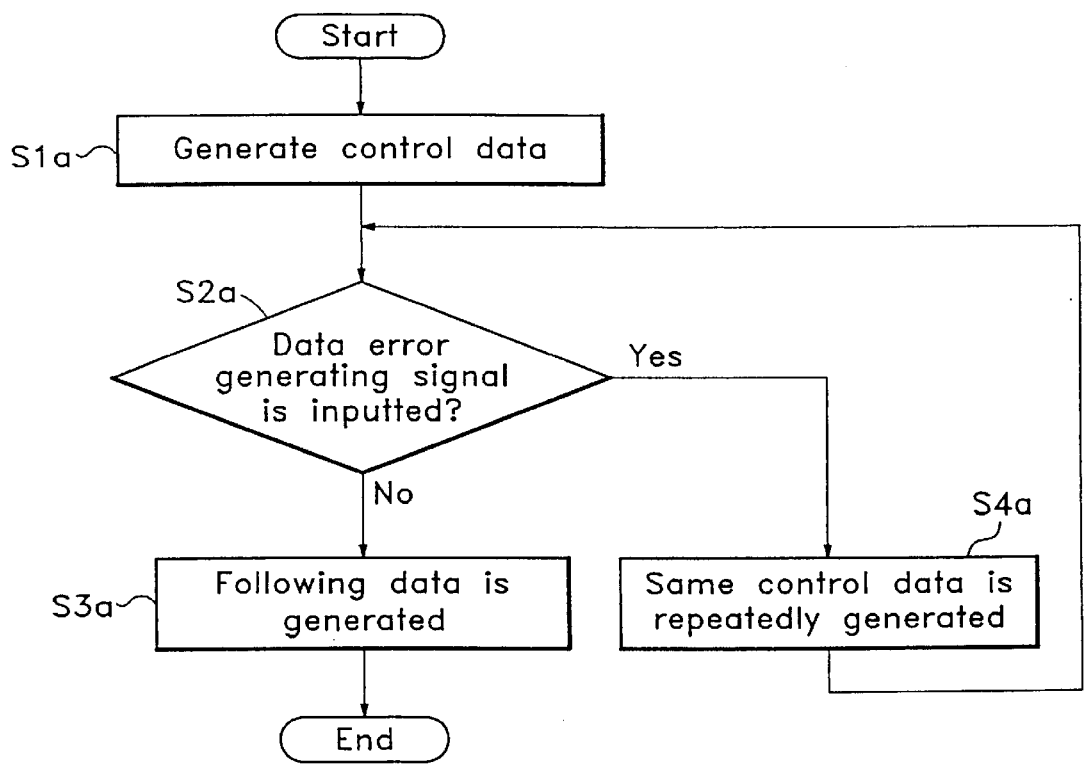

FIG. 4 is a flow chart illustrating the operation of main microcomputer 10 which receives the data error generating signal "Error". First, main microcomputer 10 generates control data to control sub microcomputer 20 having another function (S1a). Main microcomputer 10 then checks whether the data error generating signal "Error" which is fed back has been received or inputted (S2a). When the data error generating signal "Error" is not received or inputted, main microcomputer 10 generates following data (S3a). When the data error generating signal "Error" is received or inputted, the same control data which is previously generated is repeatedly generated (S4a). Upon each repeated generation of control data, main microcomputer 10 checks for the presence of data error generating signal "Error" (S2a).

Figure 5:
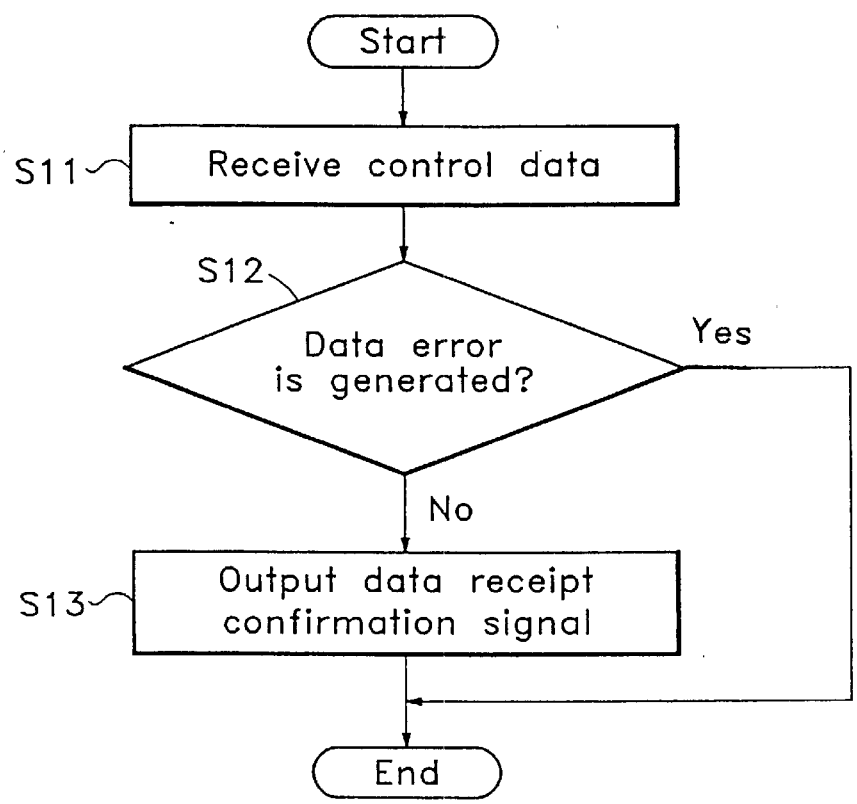

FIG. 5 is a flow chart illustrating the operation of the sub microcomputer 20 which outputs the data receipt confirmation signal "ACK". Sub microcomputer 20 receives control data which is generated by main microcomputer 10 (S11), and detects whether an error is present in the received data (S12). When no errors are detected, the data receipt confirmation signal "ACK" is output to main microcomputer 10 (S13). In the event that an error is found, sub microcomputer 20 does not generate the data receipt confirmation signal "ACK" and thereby informs main microcomputer 10 of the error.

Figure 6:
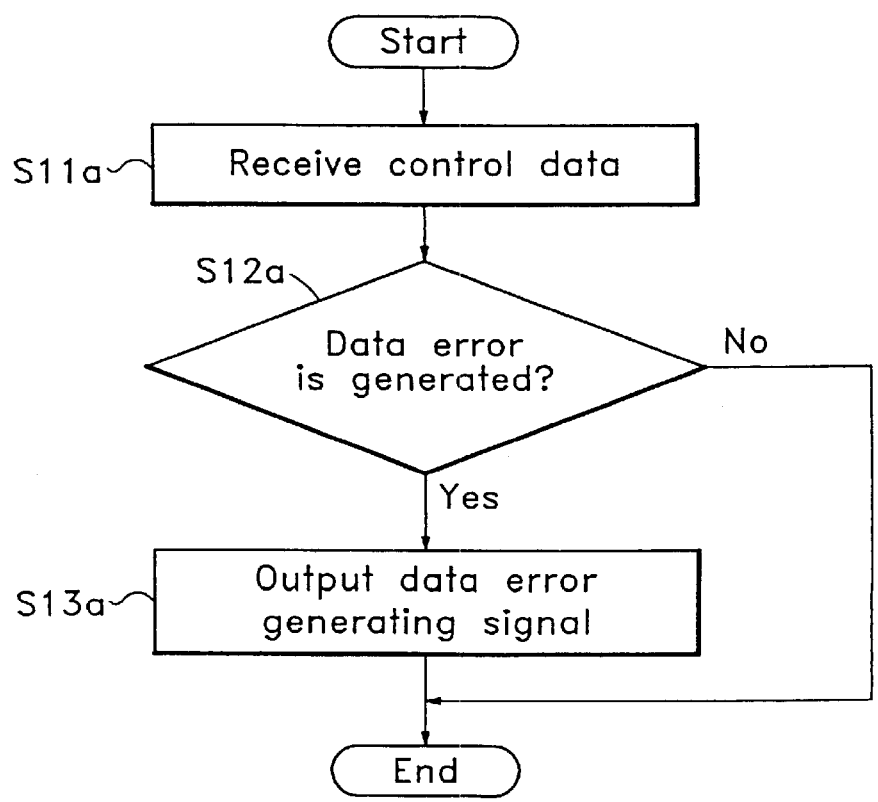

FIG. 6 is a flow chart illustrating the operation of sub microcomputer 20 which outputs the data error generating signal. First, sub microcomputer 20 receives control data generated in the main microcomputer 10 (S11a), and detects whether an error is present in the received control data (S12a). When errors are detected, sub microcomputer 20 outputs the data error generating signal "Error" to main microcomputer 10 (S13a), and thereby informs the main microcomputer 10 of the error. When no errors are found, sub microcomputer 20 does not generate the data error generating signal "Error".

As described above, when transmitting data from the main microcomputer 10 to the sub microcomputer 20 in the combined electronic product, sub microcomputer 20 generates the data receipt confirmation signal "ACK" or the data error generating signal "Error". When the checked transmitted data contains an error, main microcomputer 10 repeatedly generates the same data to attempt re-transmission. When no errors are found, main microcomputer 10 generates following data, thereby preventing a malfunction of the sub microcomputer 20 caused by the error in transmitting the data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multifunctional integrated electronic product, comprising:

a main microcomputer having at least one input/output port for receiving and sending data, said main microcomputer generating a control data signal to control an external device;

a data bus having one end coupled to said input/output port of said main microcomputer and a second end; and a sub microcomputer having at least one input/output port connected to said second end of said data bus and receiving said control data signal from said main microcomputer, said sub microcomputer determining the presence of an error in said control data signal and transmitting a data receipt confirmation signal to said main microcomputer when no error is detected, and transmitting a data error generating signal to said main microcomputer when an error is detected, said sub microcomputer transmitting one of said confirmation signal and said data error generating signal without receiving a request for either of said signals from said main microcomputer, wherein said main microcomputer transmits following data when no errors are present in the control data signal.

2. The apparatus according to claim 1, wherein said main microcomputer checks for the presence of the data receipt confirmation signal, and repeatedly generates said control signal in response to the absence of the data receipt confirmation signal.

3. The apparatus according to claim 1, wherein said main microcomputer checks for the presence of the data error generating signal, and repeatedly generates said control signal in response to the presence of the data error generating signal.

4. A method for preventing a malfunction caused by a data transmission error in a multifunctional integrated electronic product including a main microcomputer and a sub microcomputer configured as master and slave, respectively, comprising the steps of:

> transmitting control data from said main microcomputer to said sub microcomputer to control said sub microcomputer;
>
> checking whether an error is present in the received control data;
>
> generating following data from said main microcomputer to said sub microcomputer when no errors are present in said control data;
>
> transmitting a data error generating signal from said sub microcomputer to said main microcomputer when at least one error is detected in said control data, wherein said sub microcomputer transmits said data error generating signal without receiving a request for said signal from said main microcomputer;
>
> checking for the presence of the data error generating signal in the main microcomputer; and
>
> repeatedly generating the control data in response to the presence of the data error generating signal.

5. The method according to claim 4, further comprising the steps of:

> outputting a data receipt confirmation signal from said sub microcomputer to said main microcomputer in response to no errors detected in said control signal by the error-checking;
>
> checking for the presence of the data receipt confirmation signal in the main microcomputer; and
>
> repeatedly generating the control data in response to the absence of the data receipt confirmation signal.

6. A method for preventing a malfunction caused by a data transmission error in a multifunctional integrated electronic product including a main microcomputer and a sub microcomputer configured as master and slave, respectively, comprising the steps of:

> transmitting control data from said main microcomputer to said sub microcomputer to control said sub microcomputer;
>
> checking whether an error is present in the received control data;
>
> generating following data from said main microcomputer to said sub microcomputer when no errors are present in said control data;
>
> transmitting a data receipt confirmation signal from said sub microcomputer to said main microcomputer when no errors are detected in said control data, wherein said sub microcomputer transmits said data receipt confirmation signal without receiving a request for said signal from said main microcomputer;
>
> checking for the presence of the data receipt confirmation signal in the main microcomputer; and
>
> repeatedly generating the control data in response to the absence of the data receipt confirmation signal.

7. The method as recited in claim 5, wherein said sub microcomputer transmits said data receipt confirmation signal without receiving a request for said signal from said main microcomputer.

* * * * *